US006909876B2

(12) United States Patent
Higashino et al.

(10) Patent No.: US 6,909,876 B2

(45) Date of Patent: Jun. 21, 2005

(54) PORTABLE TERMINAL

(75) Inventors: Mitsuhiro Higashino, Maebashi (JP); Hirohide Nishida, Maebashi (JP)

(73) Assignee: Fujitsu Limited, Kawasaki (JP)

(*) Notice: Subject to any disclaimer, the term of this patent is extended or adjusted under 35 U.S.C. 154(b) by 445 days.

(21) Appl. No.: 10/088,108

(22) Filed: Mar. 25, 2002

(65) Prior Publication Data

US 2002/0115410 A1 Aug. 22, 2002

Related U.S. Application Data

(63) Continuation of application No. PCT/JP99/06563, filed on Nov. 25, 1999.

(51) Int. Cl.[7] .................................................. H04B 7/00

(52) U.S. Cl. .................. 455/41.2; 455/414.1; 455/703; 455/63.3; 455/71; 455/447; 455/62; 455/407; 340/928

(58) Field of Search ............................ 455/407, 62, 71, 455/447, 41.1, 41.2, 63.3, 703, 41.3, 414.1, 414.2, 414.3, 414.4; 340/928, 933; 235/384, 380; 701/1, 18, 29

(56) References Cited

U.S. PATENT DOCUMENTS

| | | | | | |
|---|---|---|---|---|---|
| 4,963,723 | A | * | 10/1990 | Masada | 235/384 |
| 5,451,758 | A | * | 9/1995 | Jesadanont | 235/384 |
| 5,857,152 | A | * | 1/1999 | Everett | 455/406 |
| 5,952,940 | A | * | 9/1999 | Matsumoto | 340/905 |
| 6,070,067 | A | * | 5/2000 | Nguyen et al. | 455/407 |
| 6,078,806 | A | * | 6/2000 | Heinonen et al. | 455/406 |
| 6,088,680 | A | | 7/2000 | Hoshino et al. | |
| 6,295,448 | B1 | * | 9/2001 | Hayes et al. | 455/420 |
| 6,342,844 | B1 | * | 1/2002 | Rozin | 340/933 |
| 6,493,562 | B2 | * | 12/2002 | Yoshida et al. | 455/517 |
| 6,658,392 | B2 | * | 12/2003 | Yoshida | 705/13 |

FOREIGN PATENT DOCUMENTS

| | | |
|---|---|---|
| EP | 784 297 | 1/1997 |
| JP | 8-7139 | 1/1996 |
| JP | 8-273009 | 10/1996 |
| JP | 8-297761 | 11/1996 |
| JP | 9-19055 | 7/1997 |
| JP | 9-215036 | 8/1997 |
| JP | 11-7562 | 1/1999 |

* cited by examiner

*Primary Examiner*—Nick Corsaro
*Assistant Examiner*—Shaima Q. Aminzay
(74) *Attorney, Agent, or Firm*—Arent Fox PLLC

(57) ABSTRACT

A portable terminal of this invention has a portable phone control section which performs processing for a portable phone via a radio wave in a certain frequency band. This portable terminal also has a transmission section and a reception section which have respective functions as an on-board machine in an electronic toll collection system and transacts ETC information on automatic toll collection to and from a radio equipment installed at a tollgate via a radio wave in a different frequency band. A common control unit also provided in the portable terminal controls switching between the functions as the terminal and the machine according to the frequency band of the received radio wave. Thus, the electronic toll collection system can be used by the user at a low cost, and also established as the infrastructure.

4 Claims, 8 Drawing Sheets

FIG.5

| STATE | INSERTION STATE OF IC CARD 3 | PRESSED STATE OF ETC BUTTON 106 | POSITION OF OWN VEHICLE | MODE OF PORTABLE TERMINAL 100 |
|---|---|---|---|---|
| 1 | UNINSERTED<br>IC CARD READER/WRITER 130, IC CARD 3 | UNPRESSED<br>106 | OUTSIDE ETC AREA<br>M<br>ETC AREA | (PORTABLE PHONE MODE: DOES NOT FUNCTION AS ETC ON-BOARD MACHINE) |
| 2 | INSERTED<br>IC CARD READER/WRITER 130, IC CARD 3 | UNPRESSED<br>106 | OUTSIDE ETC AREA<br>M<br>ETC AREA | (PORTABLE PHONE MODE: DOES NOT FUNCTION AS ETC ON-BOARD MACHINE) |
| 3 | UNINSERTED<br>IC CARD READER/WRITER 130, IC CARD 3 | PRESSED<br>106 | OUTSIDE ETC AREA<br>M<br>ETC AREA | (PORTABLE PHONE MODE: DOES NOT FUNCTION AS ETC ON-BOARD MACHINE) |
| 4 | UNINSERTED<br>IC CARD READER/WRITER 130, IC CARD 3 | UNPRESSED<br>106 | WITHIN ETC AREA<br>M<br>ETC AREA | (PORTABLE PHONE MODE: DOES NOT FUNCTION AS ETC ON-BOARD MACHINE) |
| 5 | INSERTED<br>IC CARD READER/WRITER 130, IC CARD 3 | PRESSED<br>106 | OUTSIDE ETC AREA<br>M<br>ETC AREA | (ETC/PORTABLE PHONE MODE: DOES NOT FUNCTION AS ETC ON-BOARD MACHINE) |
| 6 | UNINSERTED<br>IC CARD READER/WRITER 130, IC CARD 3 | PRESSED<br>106 | WITHIN ETC AREA<br>M<br>ETC AREA | (PORTABLE PHONE MODE: DOES NOT FUNCTION AS ETC ON-BOARD MACHINE) |
| 7 | INSERTED<br>IC CARD READER/WRITER 130, IC CARD 3 | UNPRESSED<br>106 | WITHIN ETC AREA<br>M<br>ETC AREA | (PORTABLE PHONE MODE: DOES NOT FUNCTION AS ETC ON-BOARD MACHINE) |
| 8 | INSERTED<br>IC CARD READER/WRITER 130, IC CARD 3 | PRESSED<br>106 | WITHIN ETC AREA<br>M<br>ETC AREA | (ETC/PORTABLE PHONE MODE: FUNCTIONS AS ETC ON-BOARD MACHINE) |

PORTABLE TERMINAL

This application is a continuation of PCT/JP99/06563 Nov. 25, 1999.

TECHNICAL FIELD

The present invention relates to a portable terminal used both as a portable phone terminal and as an on-board machine in a drive-thru automatic toll collection system which performs automatic payment of the toll, when a vehicle passes a tollgate of a toll road (for example, a highway), without stopping.

BACKGROUND ART

Conventionally, road improvement cannot follow the increase in the traffic volume, due to a delay in the administrative management of a nation or a district government, and traffic jams are becoming a social problem. In particular, near a tollgate of a toll road, vehicles must stop temporarily in order to receive a pass and pay the toll, and hence traffic jams tend to occur.

Therefore, a drive-thru automatic toll collection system (ETC: Electronic Toll Collection System) has been recently developed as a unit which alleviates traffic jams, and has been already experimentally operated in some toll roads. This electronic toll collection system is a system in which tolls are automatically paid by performing radio communication between a non-board machine for the ETC mounted on a vehicle and a roadside radio equipment for the ETC installed at a tollgate. In this electronic toll collection system, it is not necessary for vehicles to stop temporarily at the tollgate, and hence it is considered promising as a unit which effectively alleviates traffic jams.

FIG. 6 is a diagram which explains a summary of a conventional electronic toll collection system. As shown in this figure, the electronic toll collection system is roughly constituted of an ETC on-board machine 2 and an IC (integrated circuit) card 3 mounted on a vehicle 1, and an ETC roadside radio equipment 4 installed at tollgates in toll roads. The ETC on-board machine 2 performs radio communication with the ETC roadside radio equipment 4, by a full duplex communication system using a radio wave in a 5.8 GHz band.

FIG. 7 is a diagram showing the appearance and construction of the ETC on-board machine 2. The ETC on-board machine 2 shown in this figure is installed on a dashboard of a vehicle 1 (see FIG. 6). A transmission/reception circuit (not shown) is built in a housing 2*a*. A display 2*c* which displays the toll or the like of the toll road, an operation button 2*e* which is pressed by a driver at the time of various operations and a power button 2*f* which turns on/off the power source are respectively arranged on an operation panel 2*b*. An IC card insertion slot 2*d* is also formed on the operation panel 2*b*, to which the IC card 3 (see FIG. 8) is inserted.

The IC card 3 shown in FIG. 8 comprises a base material 3*a* and an IC 3*b*. The base material 3*a* is formed in a thin plate shape from PVC (vinyl chloride polymer), PVCA (vinyl chloride-vinyl acetate polymer) or the like. The thickness of this base material 3*a* is 0.76 mm. The IC 3*b* is formed of a CPU (central processing unit) which controls each section, a non-volatile memory which stores ETC information J and a volatile memory, which are not shown here.

The ETC information J is the information necessary for payment of the toll of the toll road, and comprises deposit information, entrance information, exit information, use amount information and route information. The deposit information is the information comprising the amount deposited in the bank account of a user for payment of tolls of toll roads and the date of deposit. In the example shown in the figure, "1999 Aug. 10 Deposit ¥10,000" is the deposit information. In the electronic toll collection system, the amount of use is automatically deducted from the bank account.

The use amount information is the information comprising tolls of toll roads, the date of use, the balance in the bank account and date of balance inquiry. In the example shown in FIG. 8, "1999 Aug. 11 Amount of use ¥1,500" and "1999 Aug. 13 Amount of use ¥3,000" are the use amount information. The entrance information is the information comprising the name of the entrance (interchange, junction, etc.) of the toll road and the date when the vehicle 1 passes the entrance. In the example shown in the figure, "1999 Aug. 11 Entrance ABC interchange" is the entrance information.

The exit information is the information comprising the name of the exit (interchange, junction, etc.) of the toll road and the date when the vehicle 1 passes the exit. In the example shown in the figure, "1999 Aug. 11 Exit DEF interchange" is the exit information. The names of the exit and entrance are generally names of tollgates in the toll road. The route information is the information showing the traffic route of the vehicle 1.

The above-described IC card 3 is inserted into the card insertion slot 2*d* (see FIG. 7) of the ETC on-board machine 2 shown in FIG. 6. The ETC on-board machine 2 receives the deposit information, entrance information, route information, exit information, and use amount information via radio waves from the ETC roadside radio equipment 4, and writes these information in the IC card 3. The ETC on-board machine 2 also reads the entrance information and the route information from the IC card 3 and transmits these to the ETC roadside radio equipment 4 via radio waves.

A plurality of ETC roadside radio equipments 4 shown in FIG. 6 is installed at the tollgate of the toll road. That is, the plurality of ETC roadside radio equipments 4 is installed at the entrance and the exit of the toll road. The ETC roadside radio equipment 4 installed at the entrance transmits the above-mentioned route information and entrance information to the vehicle 1 approaching the entrance.

On the other hand, the ETC roadside radio equipment 4 installed at the exit receives the entrance information and the route information from the ETC on-board machine 2, and then transmits the exit information and the use amount information to the ETC on-board machine 2 of the vehicle 1. The amount of use in the use amount information is calculated by a toll calculation computer (not shown) on-line connected with the ETC roadside radio equipment 4, based on the entrance information, route information and exit information.

In the above construction, when the vehicle 1 shown in FIG. 6 approaches an entrance of the toll road, the ETC on-board machine 2 receives the route information and the entrance information from the ETC roadside radio equipment 4 installed at the entrance, and then writes these information in the IC card 3. During this operation, the vehicle 1 passes through the entrance without stopping, and goes down the toll road.

When the vehicle 1 approaches an exit of the toll road, the ETC on-board machine 2 receives the exit information from the ETC roadside radio equipment 4 installed at the exit, and reads the entrance information and the route information from the IC card 3 and then transmits these information to the ETC road side radio equipment 4. Thereby, the ETC roadside radio equipment 4 receives the entrance information and the route information, and transmits the entrance information, the route information and the exit information to the toll calculation computer online.

The toll calculation computer calculates the toll of the toll road for the vehicle 1, based on the entrance information, the route information and the exit information, and automatically deducts the amount of use from the bank account of the user. The toll calculation computer then transmits the amount of use and the balance in the bank account after the deduction as the use amount information to the ETC roadside radio equipment 4 online.

Thereby, the ETC roadside radio equipment 4 transmits the use amount information to the ETC on-board machine 2 of the vehicle 1. The ETC on-board machine 2 receives the use amount information from the ETC roadside radio equipment 4, and writes these in the IC card 3, as well as displaying the amount of use on the display 2*c*. During this operation, the vehicle 1 passes through the exit without stopping, and goes down the ordinary road (free road).

As described above, the conventional electronic toll collection system allows payment of the toll of the toll road without making the vehicle 1 stop at the entrance and the exit of the toll road, and hence it is excellent as a unit which alleviates traffic jams.

In order to effectively use the electronic toll collection system, it is essential to increase the rate of installation of the ETC on-board machine 2 in all vehicles traveling the toll road. In other words, it is a decisive factor how to encourage owners of ordinary vehicles to install the ETC on-board machine 2, in order to establish this electronic toll collection system as the infrastructure. That is to say, it is important to provide an ETC on-board machine 2 which stimulates buying intention of the user.

Normally, when consumers buy car-related products, they decide whether to buy or not, taking into consideration that it is not expensive, easy to install, easy to use, etc. as the examination items. However, since the electronic toll collection system is in an initial stage of introduction, there is a problem in that the production cost of the ETC on-board machine 2 is high.

Further, it is assumed that the ETC on-board machine 2 is installed on the dashboard of the vehicle. However, since car navigation systems are popular before the introduction of the electronic toll collection system, the display for the car navigation system has already been installed on the dashboard of the vehicle, and there may be no space which installs the ETC on-board machine 2.

As described above, since the ETC on-board machine 2 does not always stimulate the buying intention of users, there are problems heretofore in establishing the electronic toll collection system as the infrastructure.

It is an object of the present invention to provide a portable terminal by which users can use the electronic toll collection system at a low cost, and which can establish the electronic toll collection system as the infrastructure.

DISCLOSURE OF THE INVENTION

In order to achieve the above object, the present invention comprises a portable phone unit (corresponding to a portable phone control section 121 in one embodiment described below) which performs processing related to a portable phone via a radio wave in a first frequency band, an automatic toll collection unit (corresponding to a common control section 141 in one embodiment described below) which has a function as an on-board machine in an electronic toll collection system and transmits and receives automatic toll collection information related to automatic toll collection to and from a radio equipment installed at a tollgate via radio wave in a second frequency band different from the first frequency band, and a control unit (corresponding to a common control section 141 in one embodiment described below) which controls switching between the function of the portable phone unit and the function of the automatic toll collection unit, according to the frequency band of the received radio wave.

According to this invention, when the radio wave in the first frequency band is received, the function of the portable terminal is switched to the function of the portable phone unit by the control unit. As a result, the portable terminal functions as an existing portable phone terminal. On the other hand, when the radio wave in the second frequency band is received, the function of the terminal is switched to the function of the automatic toll collection unit by the control unit. As a result, the terminal functions as an on-board machine in the electronic toll collection system.

As described above, in the present invention, since one portable terminal has the function as the portable phone terminal, and the function as the on-board machine in the electronic toll collection system, the on-board machine in the electronic toll collection system can be substantially popularized, taking advantage of the portable phone terminal which boasts of remarkable coverage. Hence, the electronic toll collection system can be easily established as the infrastructure. The present invention is also capable of appropriating or sharing the parts with the existing portable phone terminal. Thus, the ETC on-board machine can be downsized at a low cost as compared to the conventional ETC on-board machine 2 (see FIG. 7).

The portable terminal of the present invention also comprises a read/write control unit (corresponding to an IC card reader/writer 130 in one embodiment described below) which controls read and write of the automatic toll collection information with respect to a recording medium used in the electronic toll collection system.

According to this invention, since the portable terminal comprises the read/write control unit, it can perform read and write from/to a recording medium used in the existing electronic toll collection system, thereby improving the user-friendliness.

The portable terminal of the present invention also comprises a display unit (corresponding to a display 101 in one embodiment described below) which can display both the information related to the portable phone and the automatic toll collection information.

According to this invention, since both the information related to the portable phone and the automatic toll collection information are displayed on the display unit, the display unit in the existing portable phone terminal can be appropriated as a common part. Thus, the ETC on-board machine can be downsized at a low cost as compared to the conventional ETC on-board machine 2 (see FIG. 7).

The portable terminal of the present invention also comprises a notification unit (corresponding to the common control section 141, the display 101 and a speaker 108 in one embodiment described below) which monitors at least the insertion state of the recording medium and notifies that the recording medium is not inserted when such a state is monitored.

According to this invention, when the recording medium is not inserted, the uninserted state is notified by the notification unit. Thus, such a situation that the electronic toll collection system cannot be used due to forgotten insertion can be avoided.

BRIEF DESCRIPTION OF THE DRAWINGS

FIG. 5 is a state transition diagram which explains the operation in one embodiment;

BEST MODE FOR CARRYING OUT THE INVENTION

The present invention will now be explained in detail with reference to the accompanying drawings.

At first, the electronic toll collection system will be explained in detail with reference to FIG. 1. This figure shows a tollgate of a toll road in which the electronic toll collection system is adopted. At the entrance IN of this tollgate, an entry lane 10 is a driving lane for vehicles which cannot use the electronic toll collection system. A ticket machine 11 is installed near the entry lane 10 and issues a pass. Each vehicle on the entry lane 10 stops temporarily at the position of the ticket machine 11. Then, the driver of each vehicle receives the pass issued by the ticket machine 11, starts the vehicle and travels the toll road.

Figure 6:
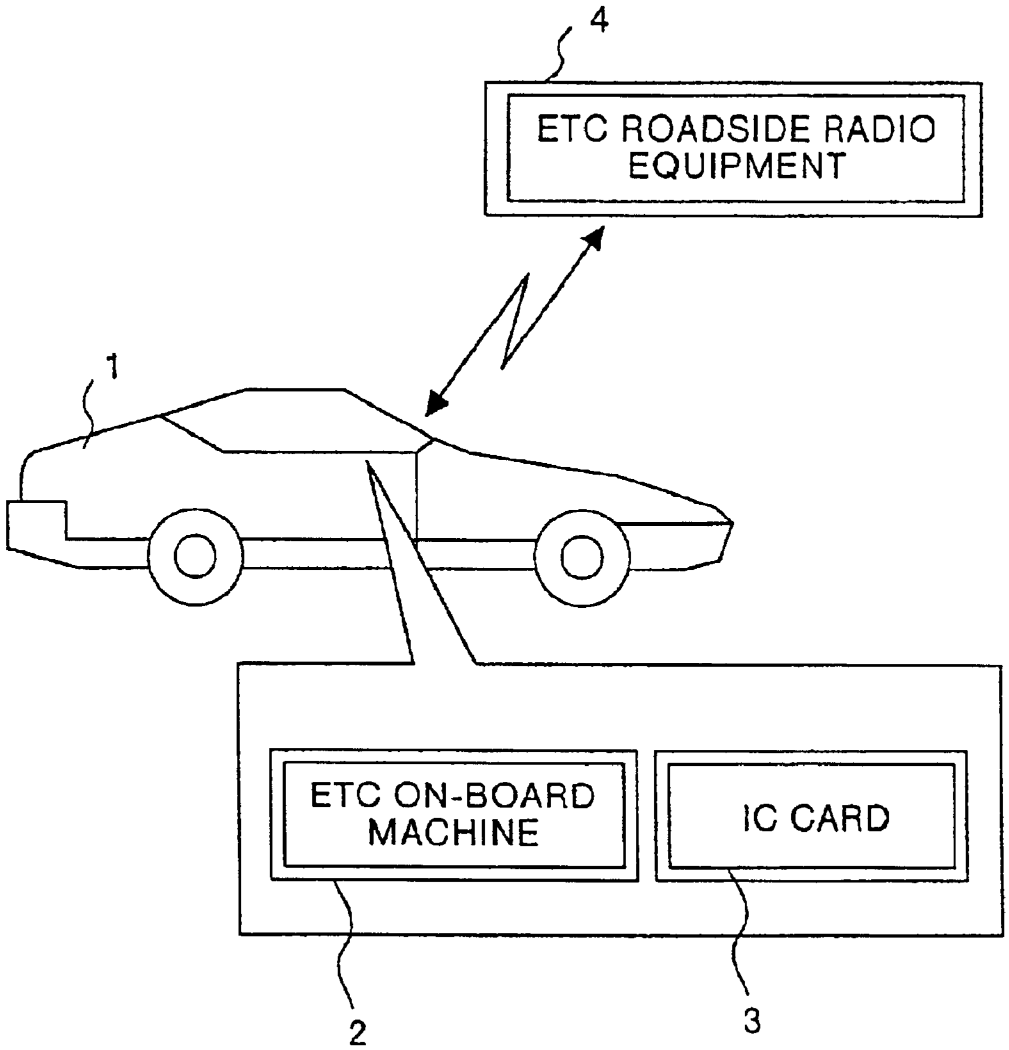
FIG. 6 is a diagram which explains the outline of the conventional electronic toll collection system.

An ETC exclusive entry lane 20 is arranged next to the entry lane 10 side by side, and is a driving lane for vehicles which can use the electronic toll collection system. An ETC roadside radio equipment 50 and an ETC roadside radio equipment 60 are disposed immediately above this ETC exclusive entry lane 20 when viewed from the entry side. The ETC roadside radio equipment 50 performs radio communication by the full duplex communication system using a radio wave in the 5.8 GHz band, in the same manner as the above-described ETC roadside radio equipment 4 (see FIG. 6). Specifically, the ETC roadside radio equipment 50 transmits the entrance information towards a range immediately below (hereinafter, referred to an ETC area) by a micro-cell method. The entrance information is the information comprising the name of the tollgate and the date when the vehicle passes the entrance IN.

The ETC roadside radio equipment 60 is arranged immediately above the ETC exclusive entry lane 20, and ahead of the ETC roadside radio equipment 50, and performs radio communication by the full duplex communication system using a radio wave in the 5.8 GHz band. Specifically, the ETC roadside radio equipment 60 transmits the route information towards the ETC area immediately below by the micro-cell method. This route information is the information indicating the traffic route of the vehicle.

On the other hand, at the exit OUT of the tollgate, an ETC exclusive exit lane 30 is a driving lane for vehicles which can use the electronic toll collection system. An ETC road side radio equipment 70 is disposed immediately above this ETC exclusive exit lane 30. The ETC roadside radio equipment 70 performs radio communication by the full duplex communication system using a radio wave in the 5.8 GHz band. Specifically, the ETC roadside radio equipment 70 transmits the exit information towards the ETC area immediately below by the micro-cell method. The exit information is the information comprising the name of the tollgate and the date when the vehicle passes the exit.

The ETC roadside radio equipment 70 receives the entrance information from the vehicle passing the ETC exclusive exit lane 30, and transmits this information to a toll calculation computer 80 online. This toll calculation computer 80 is installed at the tollgate, and calculates the toll from the entrance information, the route information and the exit information, and then automatically deducts the amount of use from the bank account of the user. The toll calculation computer 80 also transmits the amount of the toll of the toll road, the date of use, the balance in the bank account after deduction, and the date of balance inquiry, to the ETC roadside radio equipment 70 online as the use amount information. The ETC roadside radio equipment 70 transmits the use amount information from the toll calculation computer 80 towards the ETC area immediately below.

The exit lane 40 is arranged next to the ETC exclusive exit lane 30 side by side, and is a driving lane for vehicles which cannot use the electronic toll collection system. A toll collecting booth 41 is installed near the exit lane 40, which is a stand-by booth for an attendant who collects the toll. Each vehicle on the exit lane 40 stops temporarily at the position of the toll collecting booth 41. Then, the driver of each vehicle hands the pass to the attendant, and confirms the toll displayed on a display board (not shown) The driver hands over the amount of toll of the toll road to the attendant, starts the vehicle and goes down the ordinary road (free road).

A portable phone radio base station 90 is connected to a portable phone network (not shown), and communicates with portable phone terminals existing in the area which is covered by this base station, using radio waves in the 80 MHz band or in 1.5 GHz band.

Figure 2:
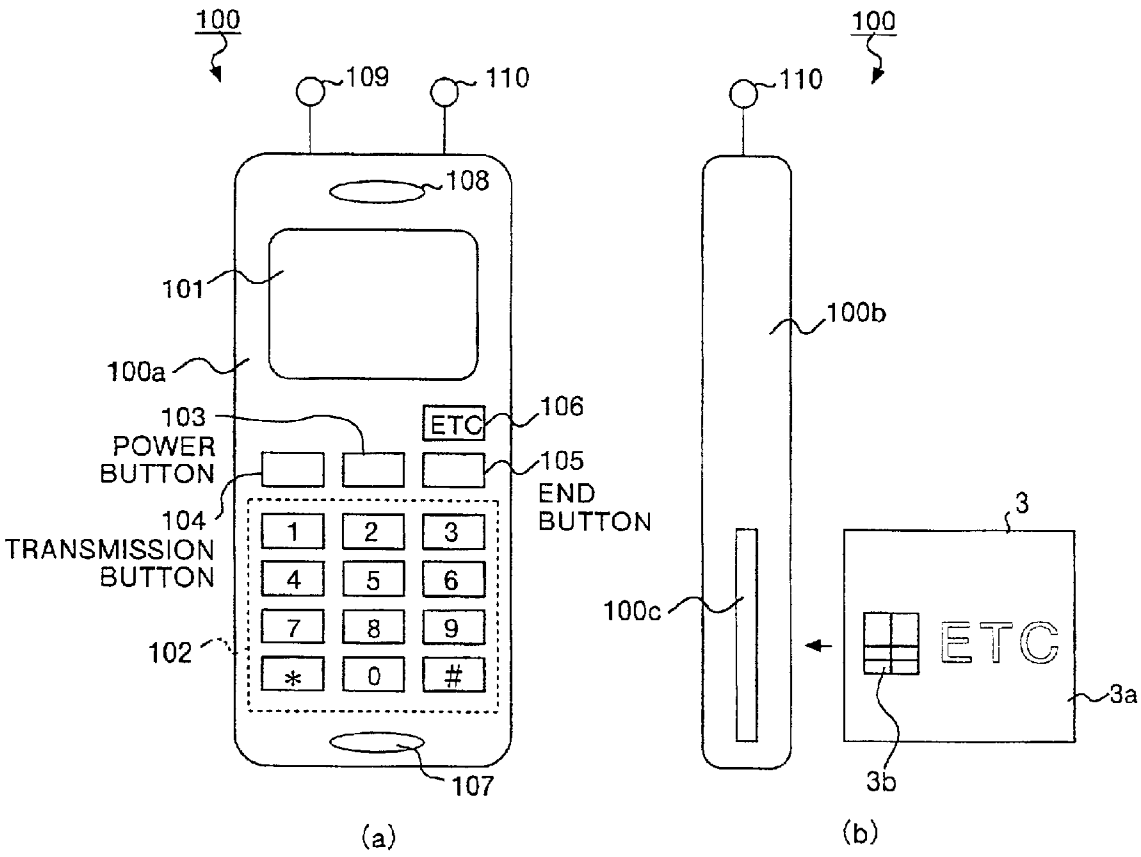
FIG. 2 is a diagram showing the appearance and construction of one embodiment according to the present invention.
Figure 3:
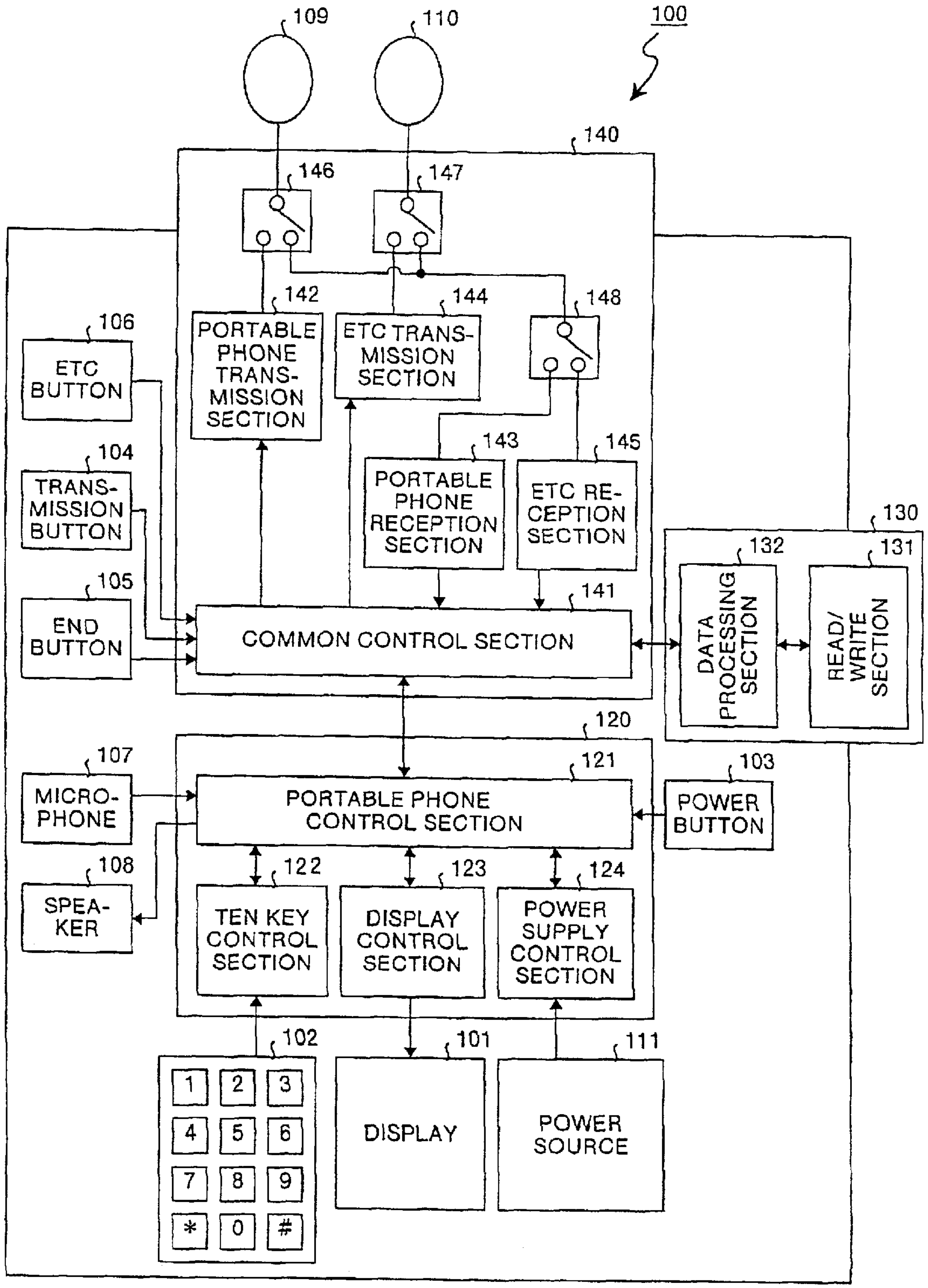
FIG. 3 is a block diagram showing the electric structure in one embodiment.

The construction of one embodiment applied in the above-described electronic toll collection system will now be explained with reference to FIG. 2 and FIG. 3. FIG. 2 is a diagram showing the appearance and construction of one embodiment. FIG. 3 is a block diagram showing the electric structure of one embodiment. A portable terminal 100 shown in FIG. 2(*a*) has both a function as the ETC on-board machine 2 (see FIG. 7) in the electronic toll collection system and a function as a portable phone terminal, and is carried by a driver of a vehicle traveling a toll road. The shape of the portable terminal 100 is substantially the same as that of an existing portable phone terminal.

Figure 8:
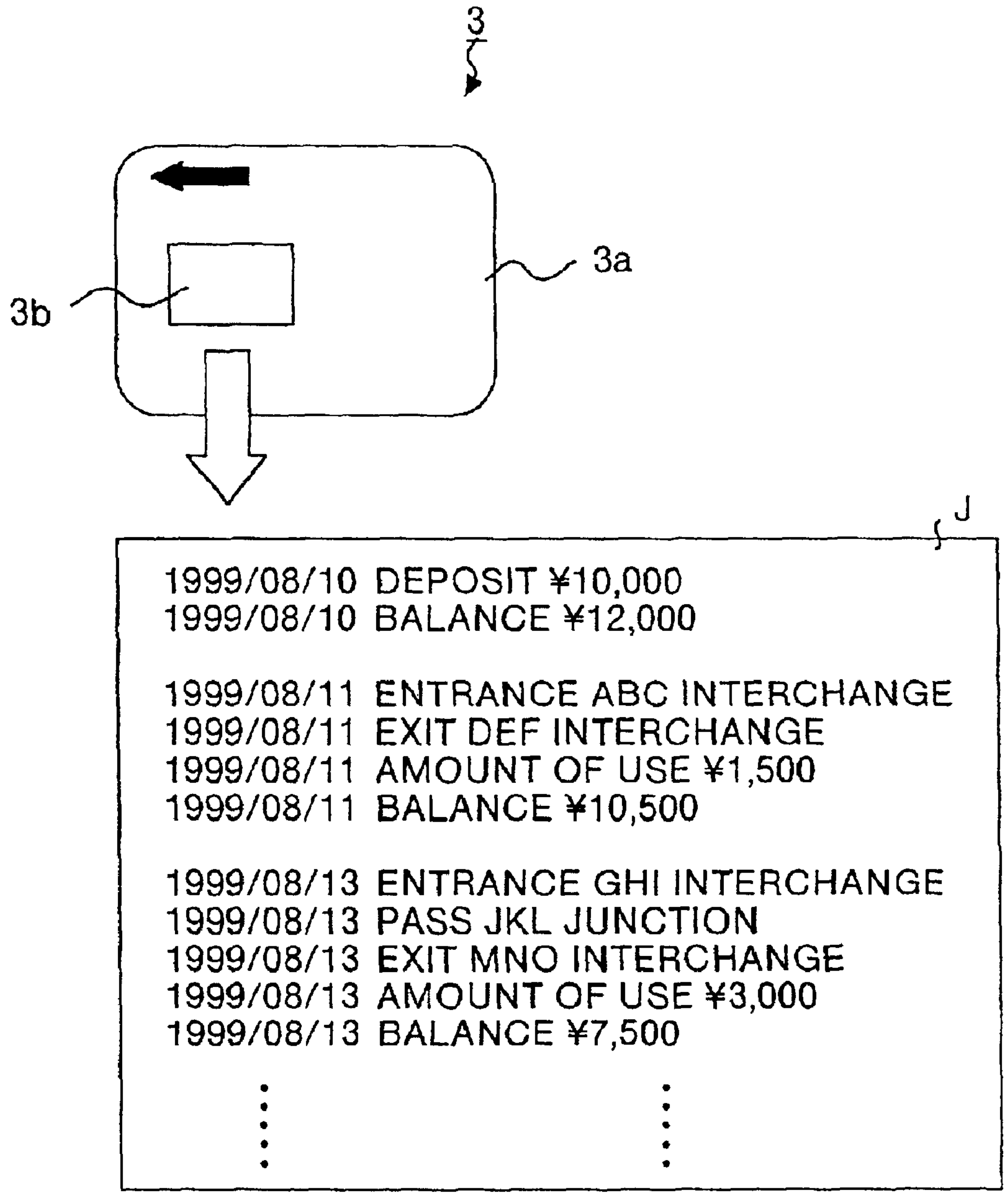
FIG. 8 is a plan view which shows the construction of the IC card 3 shown in FIG. 6.

This portable terminal 100 has a display 101 that is arranged on the surface 100*a* and displays the ETC information J in the electronic toll collection system (see FIG. 8) and communication information necessary for communication through the portable phone (telephone number, reception strength of the radio wave, incoming or outgoing message, etc.). Ten keys 102 are arranged below the display 101 in the figure and on the surface 100*a*, and are composed of keys "0" to "9", "*" and "#" used for the input of telephone numbers or the like.

A power button 103 is a button pressed at the time of turning on/off the power. A transmission button 104 is a button pressed at the time of making or receiving a call in the portable phone. An end button 105 is a button pressed at the time of finishing a call in the portable phone. An ETC button 106 is a button to be pressed when the mode of the portable terminal 100 is changed from the portable phone mode to an ETC/portable phone mode.

The above-described portable phone mode is a mode in which the portable terminal 100 functions as a portable phone terminal. On the other hand, the ETC/portable phone mode is a mode in which the portable terminal 100 functions as the ETC on-board machine 2 (see FIG. 7) in the electronic toll collection system and as a portable phone terminal.

A microphone 107 is arranged on the surface 100*a* below the ten keys 102, which is for communication in the portable phone. A speaker 108 is arranged on the surface 100*a* above the display 101, which is used for communication in the portable phone and playing various message sounds. An antenna for portable phone 109 is an antenna dedicated to the portable phone, and transmits or receives communication information to/from the portable phone radio base station 90 shown in FIG. 1, using the radio wave in the 800 MHz band or 1.5 GHz band.

Figure 1:
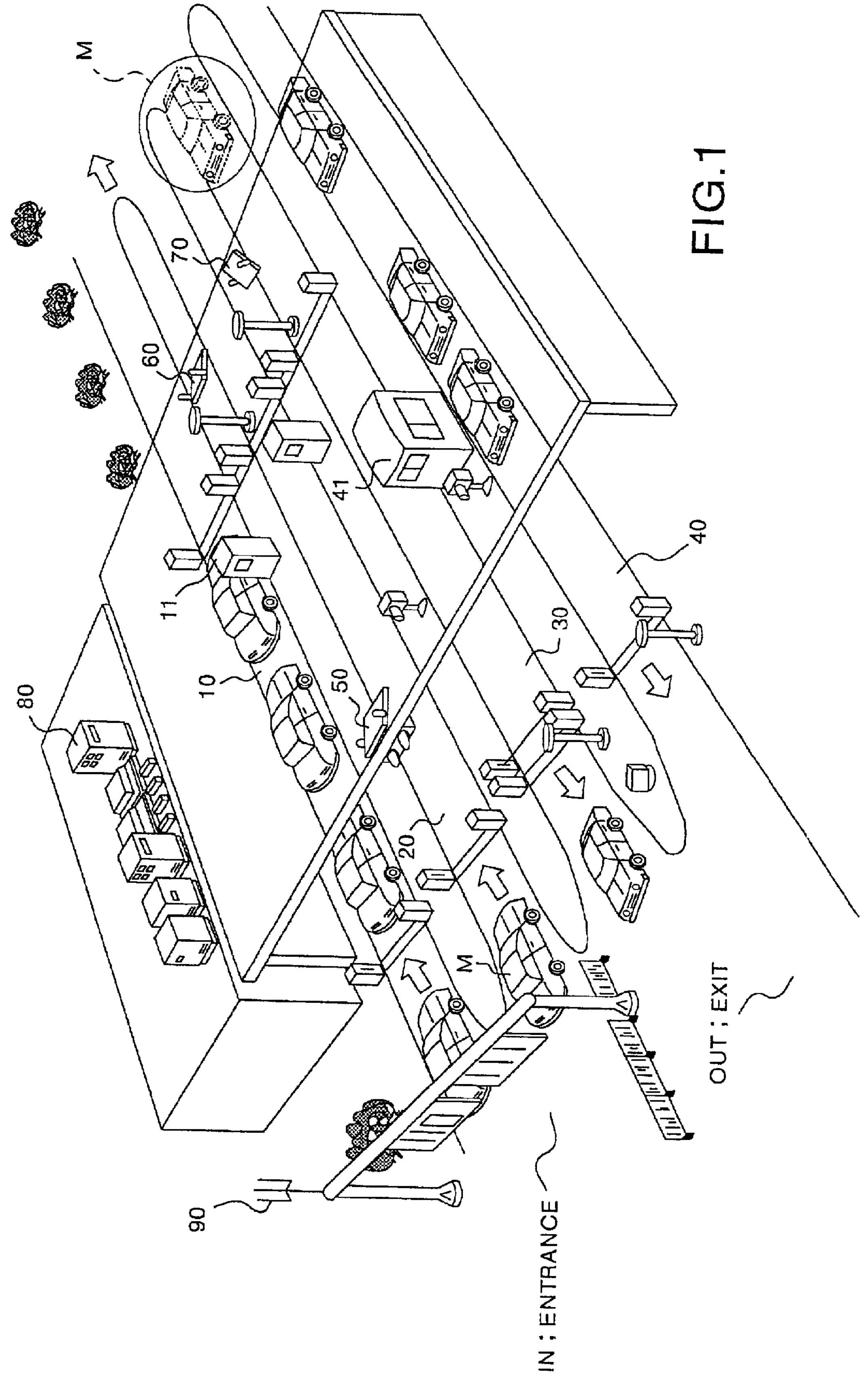
FIG. 1 is a perspective view which explains the electronic toll collection system.

An ETC antenna 110 is an antenna dedicated to the electronic toll collection system, and transmits or receives the ETC information J (see FIG. 8) to/from the ETC roadside radio equipments 50, 60 and 70 shown in FIG. 1, using the radio wave in the 5.8 GHz band. In FIG. 2(*b*), an IC card insertion slot 100*c* is formed on the right side 100*b* of the portable terminal 100 in its longitudinal direction. An IC card 3 (see FIG. 8) is inserted into this IC card insertion slot 100*c*. In this inserted state, an IC 3*b* of the IC card 3 is electrically connected to the portable terminal 100.

The electric structure of the above-described portable terminal 100 will now be explained with reference to FIG. 3. In FIG. 3, the same reference symbol is given to a portion corresponding to each section in FIGS. 2(*a*) and 2(*b*), and the explanation thereof is omitted. In FIG. 3, a power source 111 is a secondary battery such as a lithium ion battery, and supplies power to each section of the apparatus.

A portable phone section 120 is mainly composed of elements related to a portable phone. In this portable phone section 120, a portable phone control section 121 controls each section in the portable phone at the time of making a call, receiving a call, talking over the phone or ending the call. A ten key control section 122 controls the ten keys 102, and outputs a signal corresponding to a key pressed in the ten keys 102 to the portable phone control section 121. A display control section 123 performs display control in the display 101. A power supply control section 124 performs control at the time of supplying power from the power source 111 to each section.

An IC card reader/writer 130 is arranged in the vicinity of the IC card insertion slot 100*c* (see FIG. 2(*b*)), which reads the ETC information J (see FIG. 8) from the IC card 3 (IC 3*b*) inserted into the IC card insertion slot 100*c*, and writes the ETC information J in the IC card 3. In this IC card reader/writer 130, the read/write section 131 reads the ETC information J from the IC card 3 (IC 3*b*), and writes the ETC information J in the IC card 3 (IC 3*b*). The data processing section 132 processes the data in the read/write section 131.

A common section 140 comprises elements commonly used for the portable phone and the electronic toll collection system. In this common section 140, a common control section 141 performs control related to the both functions, when the portable terminal 100 functions as the portable phone terminal and when the portable terminal 100 functions as the ETC on-board machine 2 (see FIG. 7). The details of the operation of this common control section 141 will be explained later.

A portable phone transmission section 142 is a transmission section dedicated to the portable phone, which modulates a communication signal related to the portable phone and transmits the modulated signal as a radio wave in the 800 MHz or 1.5 GHz band via the portable phone antenna 109. A portable phone reception section 143 is a reception section dedicated to the portable phone, which receives the radio wave related to the portable phone in the 800 MHz or 1.5 GHz band via the portable phone antenna 109 and demodulates this signal, in the same manner as the portable phone transmission section 142.

Figure 7:
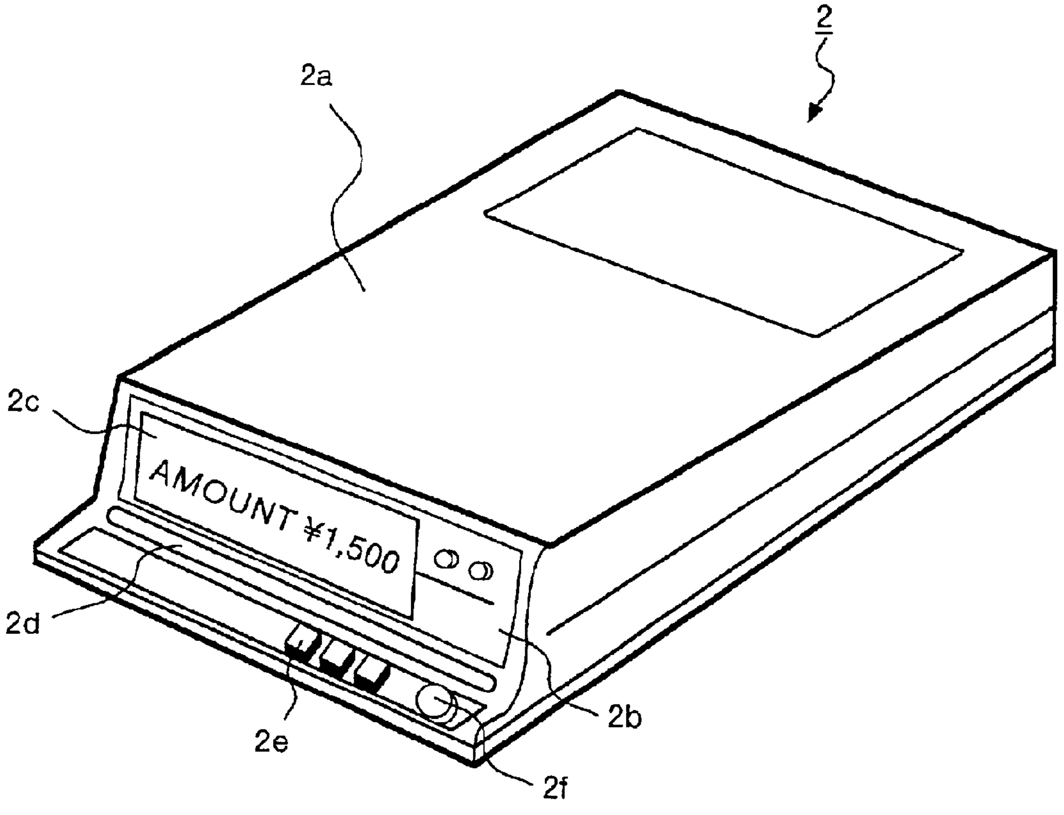
FIG. 7 is a perspective view which shows the appearance and construction of the ETC on-board machine 2 shown in FIG. 6.

An ETC transmission section 144 is a transmission section dedicated to the electronic toll collection system, which transmits the ETC information J as a radio wave in the 5.8 GHz band via the ETC antenna 110, in the same manner as the ETC on-board machine 2 (see FIG. 7). An ETC reception section 145 is a reception section dedicated to the electronic toll collection system, which receives the radio wave in the 5.8 GHz band related to the ETC information J via the ETC antenna 110. A switching device 146, a switching device 147 and a switching device 148 are controlled by the common control section 141 to perform switching between the portable phone antenna 109 and the ETC antenna 110.

The operation in one embodiment will now be explained with reference to a flowchart shown in FIG. 4. The operation in the case in which a vehicle M shown in FIG. 1 passes an entrance IN, travels a toll road, and passes an exit OUT will be explained below. At the time of passing the exit OUT, the tollgate shown in the figure is assumed to be another tollgate. It is also assumed that the vehicle M traveling the ETC exclusive entry lane 20 is equipped with the portable terminal 100 and the IC card 3 (see FIGS. 2(*a*) and 2(*b*)).

Figure 4:
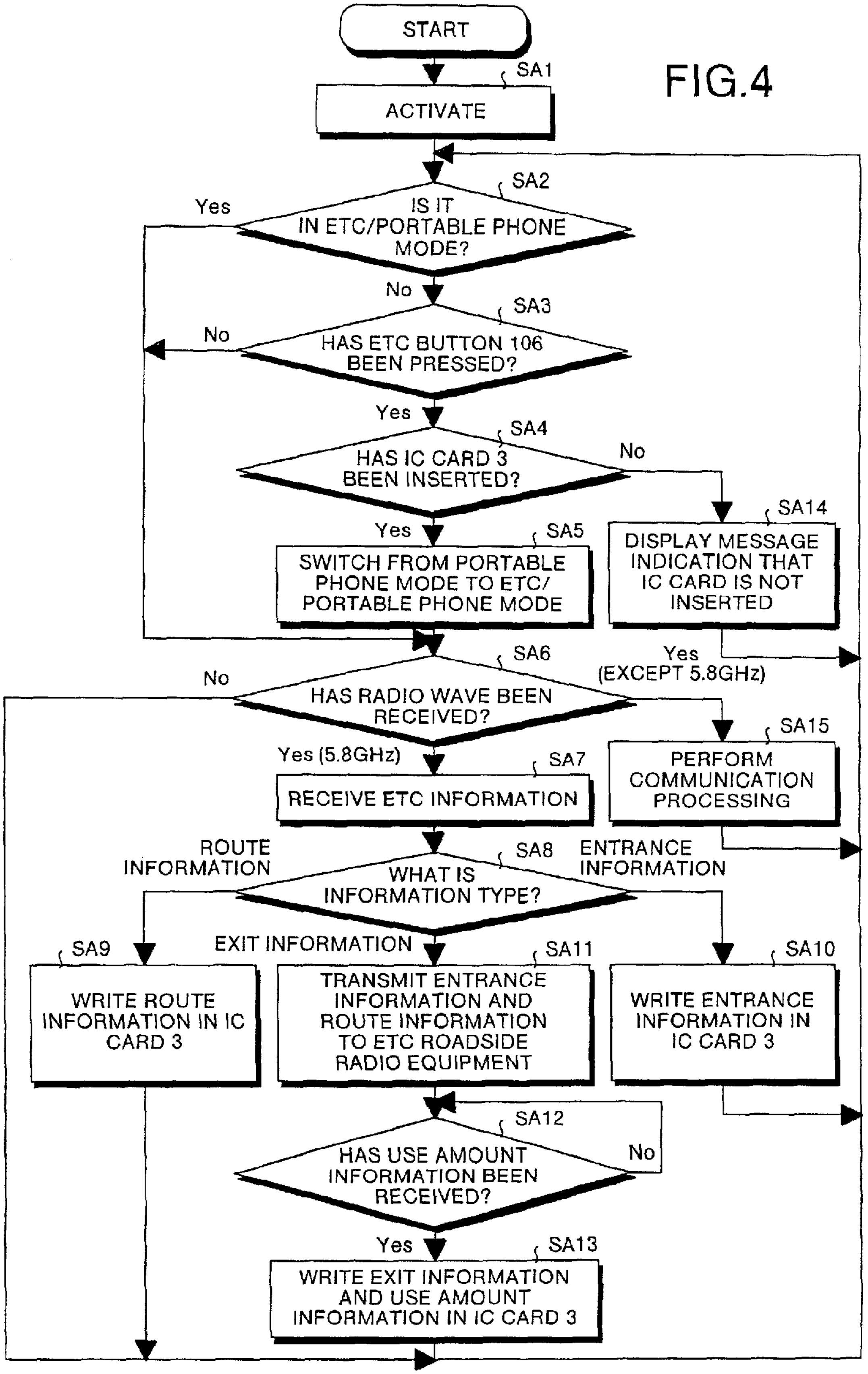
FIG. 4 is a flowchart which explains the operation in one embodiment.

In such assumption, when the driver of the vehicle M presses the power button 103 shown in FIG. 2(*a*), the portable phone control section 121 shown in FIG. 3 proceeds to step SA1 shown in FIG. 4. At step SA1, the portable phone control section 121 instructs the power supply control section 124 to perform power supply control. The power supply control section 124 performs control so as to supply power from the power source 111 to each section. Thereby, the portable terminal 100 is activated.

At next step SA2, the common control section 141 determines whether the mode of the portable terminal 100 is the above-described ETC/portable phone mode or not. Here, when the portable terminal 100 is in the state 5 or state 8 shown in FIG. 5, the common control section 141 determines that the portable terminal 100 is in the ETC/portable phone mode.

That is to say, as in the state 5 or state 8, when the IC card 3 has been inserted into the IC card reader/writer 130 (the IC card insertion slot 100*c*) and the ETC button 106 has been pressed, it is determined that the portable terminal 100 is in the ETC/portable phone mode.

As shown in the state 5, even if the mode of the portable terminal 100 is in the ETC/portable phone mode, when the vehicle M is located outside the ETC area of the ETC roadside radio equipment 50, 60 or 70, the portable terminal 100 does not function as the ETC on-board machine. On the other hand, as shown in the state 8, when the mode of the portable terminal 100 is in the ETC/portable phone mode and the vehicle M is located within the ETC area, the portable terminal 100 functions as the ETC on-board machine.

In the case of the states 1 to 4, 6 and 7 shown in FIG. 5, it is determined that the portable terminal 100 is in the portable phone mode. That is to say, in the state 1, the IC card 3 has not been inserted, and the ETC button 106 has not been pressed. In this case, the portable terminal 100 does not function as the ETC on-board machine, but functions only as the portable phone terminal. In the state 2, the IC card 3 has been inserted into the IC card reader/writer 130, but the ETC button 106 has not been pressed. In this case, the portable terminal 100 does not function as the ETC on-board machine, but functions only as the portable phone terminal.

In the state 3, the IC card 3 has not been inserted, but the ETC button 106 has been pressed. In this case, the portable terminal 100 does not function as the ETC on-board machine, but functions only as the portable phone terminal. In the state 4, the IC card has not been inserted into the IC card reader/writer 130, and the ETC button 106 has not been pressed. In this case, even if the vehicle M is located in the ETC area, the portable terminal 100 does not function as the ETC on-board machine, but functions only as the portable phone terminal.

In the state 6, the IC card 3 has not been inserted, but the ETC button 106 has been pressed. In this case, even if the vehicle M is located in the ETC area, the portable terminal 100 does not function as the ETC on-board machine, but functions only as the portable phone terminal. In the state 7, the IC card 3 has been inserted into the IC card reader/writer 130, but the ETC button 106 has not been pressed. In this case, even if the vehicle M is located in the ETC area, the portable terminal 100 does not function as the ETC on-board machine, but functions only as the portable phone terminal.

In this case, the state of the portable terminal 100 in the vehicle M traveling on the ETC exclusive entry lane 20 shown in FIG. 1 is assumed to be the state 5 shown in FIG. 5. That is, in the portable terminal 100, the IC card has been inserted into the IC card reader/writer 130, and the ETC button 106 has been pressed. It is also assumed that the vehicle M is located outside the ETC area immediately below the ETC roadside radio equipment 50 shown in FIG. 1. Therefore, in this case, since the mode of the portable terminal 100 is the ETC/portable phone mode, the common control section 141 determines that the determination result at step SA2 is "Yes", and proceeds to step SA6.

On the other hand, when the determination result at step SA2 is "No", that is, the mode of the portable terminal 100 is the portable phone mode, the common control section 141 proceeds to step SA3. At step SA3, the common control section 141 determines whether the ETC button 106 has been pressed or not, and when this determination result is "No", the common control section 141 proceeds to step SA6. When the determination result at step SA 3 is "Yes", the common control section 141 proceeds to step SA4.

At step SA4, the common control section 141 determines whether the IC card 3 has been inserted into the IC card reader/writer 130, based on the insertion state signal from the data processing section 132. When this determination result is "No", the common control section 141 proceeds to step SA14. The insertion state signal is a signal indicating whether the IC card 3 has been inserted into the IC card reader/writer 130. At step SA14, the common control section 141 instructs the portable phone section 120 to display a message indicating that the IC card has not been inserted into the portable phone section 120, and returns to step SA2.

Thereby, the portable phone control section 121 makes such a message as "The IC card has not been inserted" display on the display 101 via the display control section 123. On the other hand, when the determination result at step SA4 is "Yes", the common control section 141 changes the mode of the portable terminal 100 from the portable phone mode to the ETC/portable phone mode at step SAS and proceeds to step SA6.

At step SA6, the common control section 141 determines whether the portable phone reception section 143 or the ETC reception section 145 has received the radio wave or not via the portable phone antenna 109 or the ETC antenna 110. In this case, when it is assumed that the determination result is "No", that is, the portable terminal 100 is in a reception waiting state, the common control section 141 determines that the determination result at step SA6 is "No", and returns to step SA2 to repeat the above-described operation.

In the reception waiting state, the common control section 141 controls switching of the switching device 146 to the switching device 148, and switching of the switching device 147 to the switching device 148. Further, the common control section 141 controls switching of the switching device 148 alternately to the portable phone reception section 143 and the ETC reception section 145.

When the vehicle M traveling on the ETC exclusive entry lane 20 shown in FIG. 1 is located in the ETC area immediately below the ETC roadside radio equipment 50, the ETC reception section 145 receives the radio wave in the 5.8 GHz band from the ETC roadside radio equipment 50 via the ETC antenna 110, the switching device 147 and the switching device 148. Thereby, the common control section 141 determines that the determination result at step SA6 is "Yes", and proceeds to step SA7.

At step SA7, the common control section 141 receives the ETC information from the ETC roadside radio equipment 50 (in this case, route information), and proceeds to step SA8. At step SA8, the common control section 141 determines the information type of the ETC information. In this case, since the ETC information is the route information, the common control section 141 proceeds to step SA9. At step SA9, the common control section 141 transmits the route information to the data processing section 132, and returns to step SA2 to repeat the above-described operation. As a result, the read/write section 131 writes the route information in the IC card 3 (IC 3*b*) shown in FIG. 8.

When the vehicle M traveling on the ETC exclusive entry lane 20 shown in FIG. 1 is located in the ETC area immediately below the ETC roadside radio equipment 60, the ETC reception section 145 receives the radio wave in the 5.8 GHz band from the ETC roadside radio equipment 60 via the ETC antenna 110, the switching device 147 and the switching device 148. Thereby, the common control section 141 determines that the determination result at step SA6 is "Yes", and proceeds to step SA7.

At step SA7, the common control section 141 receives the ETC information from the ETC roadside radio equipment 60 (in this case, entrance information), and proceeds to step SA8. At step SA8, the common control section 141 determines the information type of the ETC information. In this case, since the ETC information is the entrance information, the common control section 141 proceeds to step SA10. At step SA10, the common control section 14l transmits the entrance information to the data processing section 132, and returns to step SA2 to repeat the above-described operation. As a result, the read/write section 131 writes the entrance information in the IC card 3 (IC 3*b*) shown in FIG. 8.

In this manner, the vehicle M enters into the toll road without stopping in the ETC exclusive entry lane 20. Thereafter, the vehicle M travels the toll road towards the exit OUT of another tollgate. When the vehicle M enters into the ETC exclusive exit lane 30 in the exit OUT of another tollgate and is located in the ETC area immediately below the ETC roadside radio equipment 70, the ETC reception section 145 receives the radio wave in the 5.8 GHz band from the ETC roadside radio equipment 70 via the ETC antenna 110, the switching device 147 and the switching device 148. Thereby, the common control section 141 determines that the determination result at step SA6 is "Yes", and proceeds to step SA7.

At step SA7, the common control section 141 receives the ETC information from the ETC roadside radio equipment 70 (in this case, exit information), and proceeds to step SA8. At step SA8, the common control section 141 determines the information type of the ETC information. In this case, since the ETC information is the exit information, the common control section 141 proceeds to step SA11. At step SA11, the common control section 141 issues an instruction to the data processing section 132 to read the entrance information and the route information from the IC card 3 (IC 3*b*). The read/write section 131 reads the entrance information and the route information from the IC card 3 (IC 3*b*), and transmits these information to the common control section 141 via the data processing section 132.

Thereby, the common control section 141 controls switching of the switching device 147 to the ETC transmission section 144 side, and transmits the entrance information and the route information to the ETC transmission section 144. As a result, the ETC transmission section 144 transmits the entrance information and the route information via the switching device 147 and the ETC antenna 110 to the ETC roadside radio equipment 70. After this transmission has been completed, the common control section 141 controls switching of the switching device 147 to the switching device 148 side, and proceeds to step SA12. At step SA12, the common control section 141 determines whether the ETC reception section 145 has received the use amount information from the ETC roadside radio equipment 70. In this case, the common control section 141 determines that the determination result is "No", and repeats the determination.

The entrance information and the route information transmitted from the ETC antenna 110 are received by the ETC roadside radio equipment 70. Thereby, the ETC roadside radio equipment 70 transmits the entrance information and the route information to the toll calculation computer 80 online. The toll calculation computer 80 calculates the amount of toll of the toll road for the vehicle M, based on the entrance information, the route information and the exit information, and then automatically deducts the amount of use from the bank account of the user. The toll calculation computer 80 then transmits the amount of use and the balance in the bank account after the deduction as the use amount information to the ETC roadside radio equipment 70 online.

As a result, the ETC roadside radio equipment 70 transmits the use amount information to the vehicle M located immediately below (in the ETC area). The use amount information is then received by the ETC reception section 145 via the ETC antenna 110, the switching device 147 and the switching device 148. As a result, the common control section 141 determines that the determination result at step SA12 is "Yes", and proceeds to step SA13.

At step SA 13, the common control section 141 transmits the exit information and the use amount information to the data processing section 132. Thereby, the read/write section 131 writes the exit information and the use amount information in the IC card 3 (IC 3*b*) shown in FIG. 8. The common control section 141 issues an instruction to the portable phone control section 121 to display the use amount information on the display 101, and returns to step SA2 to repeat the above-described operation.

Accordingly, the portable phone control section 121 makes the display control section 123 display a use amount message, for example, "The amount of use is ¥1,500", on the display 101. In this manner, the vehicle M travels from the toll road to the ordinary road without stopping in the ETC exclusive exit lane 30.

When the radio wave in the 800 MHz band or 1.5 GHz band is transmitted from the portable phone radio base station 90 to the portable terminal 100, the radio wave is received by the portable phone reception section 143 via the portable phone antenna 109, the switching device 146 and the switching device 148. As a result, the common control section 141 determines that the determination result at step SA6 is "Yes". In this case, since the frequency band of the received radio wave is a frequency band excluding the 5.8 GHz band (800 MHz or 1.5 GHz), the common control section 141 proceeds to step SA15.

At step SA15, the common control section 141 makes the portable phone control section 121 perform communication processing. Thereby, the portable phone control section 121 makes playing sound indicating an arrival of a call by the speaker 108. When the driver presses the transmission button 104, a radio link for the portable phone is formed between the portable terminal 100 and the portable phone radio base station 90. Thereafter, the driver talks over the phone as with the existing portable phone terminal, and when he presses the end button 105, the portable phone control section 121 terminates the communication processing. Thereby, the common control section 141 returns to step SA2 to repeat the above-described operation.

As explained above, according to one embodiment, since one portable terminal 100 has both the function as the portable phone terminal and the function as the ETC on-board machine 2 (see FIG. 7) in the electronic toll collection system, the on-board machine of the electronic toll collection system can be substantially popularized, taking advantage of the portable phone terminal which boasts of remarkable coverage. Hence, the electronic toll collection system can be easily established as the infrastructure.

According to one embodiment, it is also possible to appropriate or share the parts with the existing portable phone terminal. Thus, the ETC on-board machine can be downsized at a low cost as compared to the conventional ETC on-board machine 2 (see FIG. 7).

According to one embodiment, the portable terminal also is provided with the IC card reader/writer 130, so that the portable terminal 100 can perform read and write of the IC card 3 used in the existing electronic toll collection system, thereby improving the user-friendliness.

According to one embodiment, since both the information related to the portable phone and the ETC information J are displayed on the display 101, the display in the existing portable phone terminal can be appropriated as a common part. As a result, the ETC on-board machine can be downsized at a low cost as compared to the conventional ETC on-board machine 2 (see FIG. 7).

In addition, according to one embodiment, when the IC card 3 is in the uninserted state, such a state is notified to the user. Thereby, such a situation that the electronic toll collection system cannot be used due to forgotten insertion can be avoided.

One embodiment of the present invention has been explained in detail with reference to the drawings, but the specific construction thereof is not limited to this one embodiment, and various design changes are also included in the present invention without departing from the gist of the present invention. In one embodiment, an example, in which one portable terminal has the function of the ETC on-board machine 2 in the electronic toll collection system (see FIG. 7) and the function of the portable phone terminal, has been explained, but the function of the ETC on-board machine 2 may be included in a personal portable information-processing equipment referred to as PDA (Personal Digital Assistants).

In one embodiment, an example, in which a message indicating that the IC card has not been inserted yet is displayed on the display 101 at step SA14, has been explained, but this matter may be informed to the user by a sound from the speaker 108 under control of the common control section 141.

As described above, according to the present invention, one portable terminal has both the function as the portable phone terminal and the function as the on-board machine in the electronic toll collection system, the on-board machine in the electronic toll collection system can be substantially popularized, taking advantage of the portable phone terminal which boasts of remarkable coverage. Hence, there is the effect that the electronic toll collection system can be easily established as the infrastructure.

Since it is also possible to appropriate or share the parts with the existing portable phone terminal, there is the effect that the ETC on-board machine can be downsized at a low cost as compared to the conventional ETC on-board machine 2 (see FIG. 7).

According to the present invention, since the portable terminal also comprises the read/write control unit, so that ETC on-board machine can be downsized at a low cost as medium used in the existing electronic toll collection system, there is the effect that the user-friendliness is improved.

According to the present invention, since both the information related to the portable phone and the automatic toll collection information are displayed on the display unit, the display unit in the existing portable phone terminal can be appropriated as a common part. Thus, there is the effect that the portable terminal can be downsized at a low cost as compared to the conventional ETC on-board machine 2 (see FIG. 7).

According to the present invention, when a recording medium has not been inserted, such a state is notified to the user by the notification unit. Thus, there is the effect that such a situation that the electronic toll collection system cannot be used due to forgotten insertion can be avoided.

INDUSTRIAL APPLICABILITY

As explained above, the portable phone according to the present invention comprises a function as a portable phone terminal having high coverage, as well as a function as an on-board machine in the electronic toll collection system, and hence the electronic toll collection system can be established as the infrastructure. As a result, it is useful to alleviate traffic jams.

What is claimed is:

1. A portable terminal comprising:

a portable phone unit which performs processing related to a portable phone via a radio wave in a first frequency band;

an automatic toll collection unit which has a function as an on-board machine in an electronic toll collection system and transmits and receives automatic toll collection information related to automatic toll collection to and from a radio equipment installed at a tollgate via radio wave in a second frequency band different from the first frequency band; and a control unit which controls switching between the function of the portable phone unit and the function of the automatic toll collection unit, according to the frequency band of the received radio wave.

2. The portable terminal according to claim 1, further comprising a read and write control unit which controls read and write of the automatic toll collection information with respect to a recording medium used in the electronic toll collection system.

3. The portable terminal according to claim 1, further comprising a display unit which can display both the information related to the portable phone and the automatic toll collection information.

4. The portable terminal according to claim 2, further comprising a notification unit which monitors at least the insertion state of said recording medium, and notifies that said recording medium is not inserted when such a state is monitored.

* * * * *